UNITED STATES PATENT OFFICE 3,204,488
Patented Sept. 7, 1965

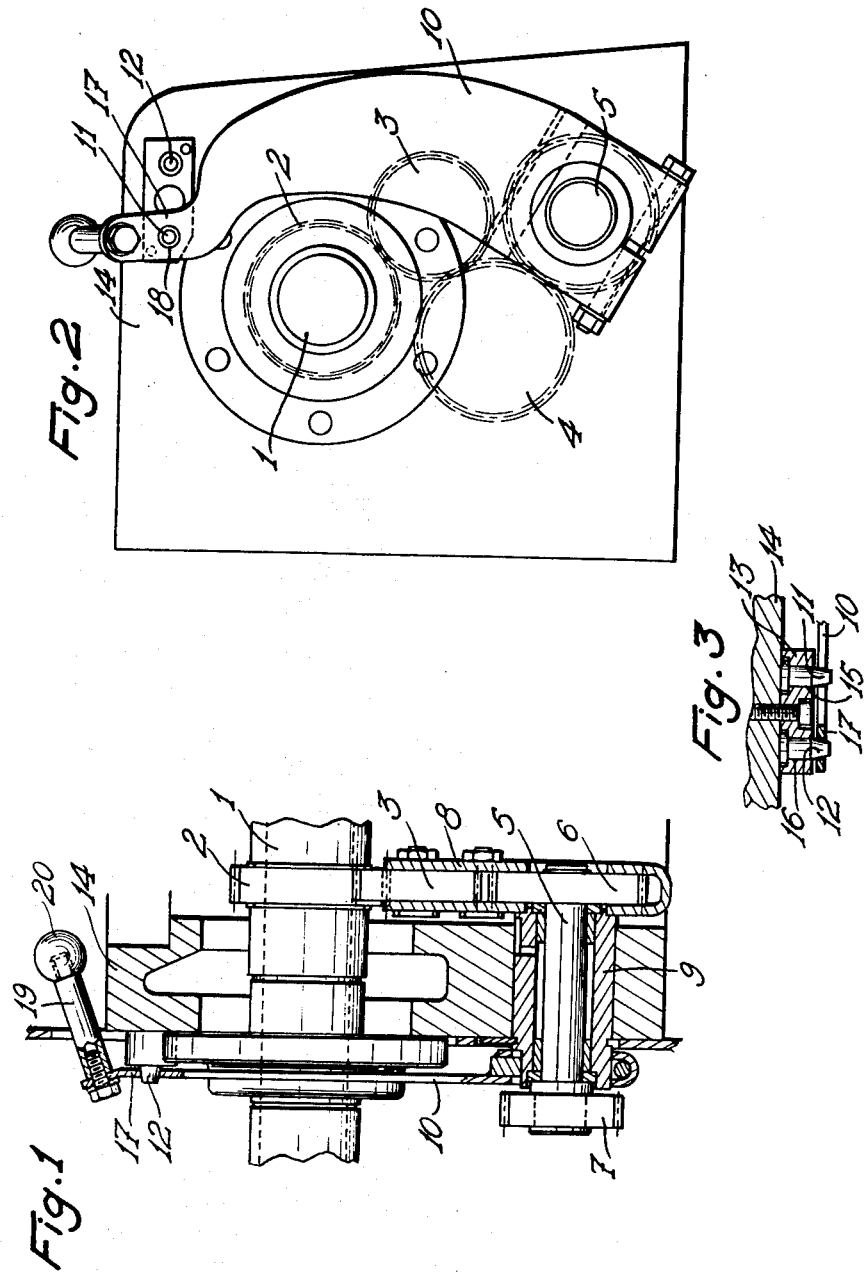

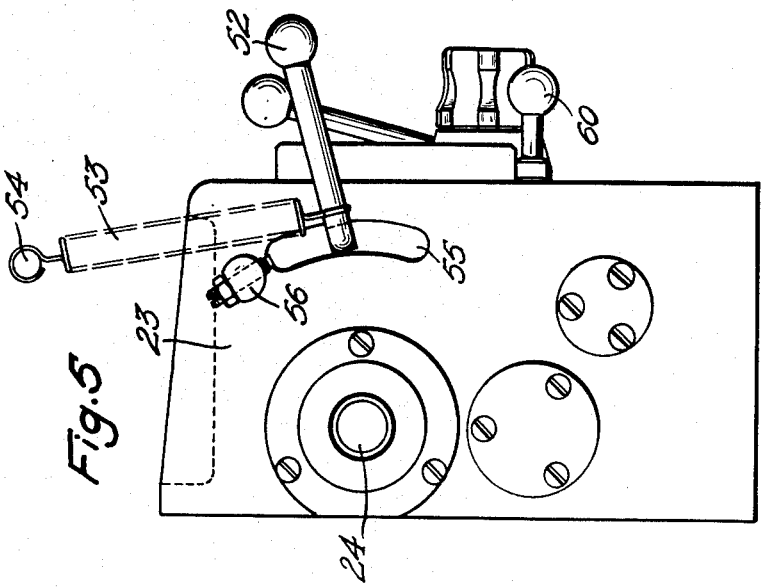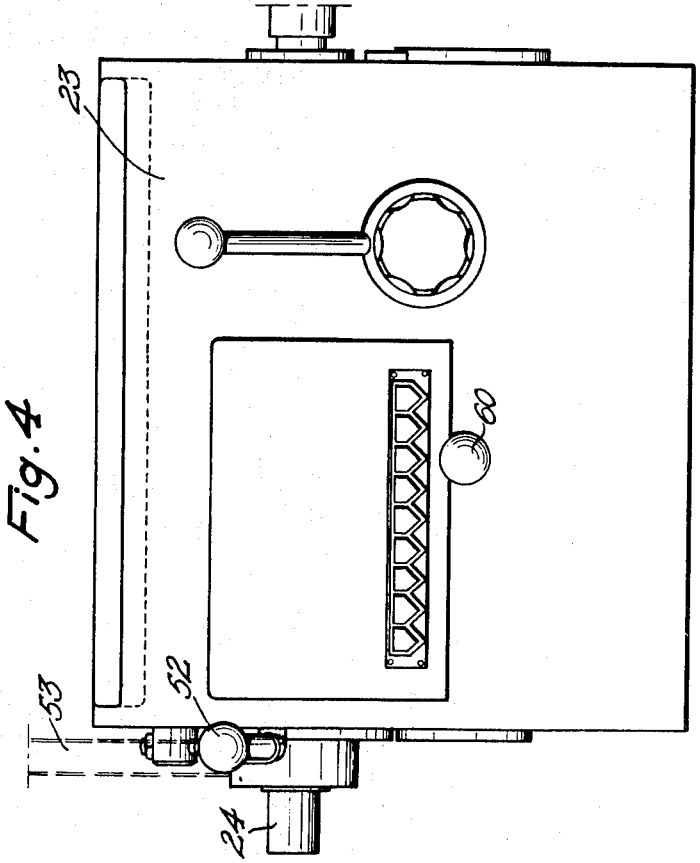

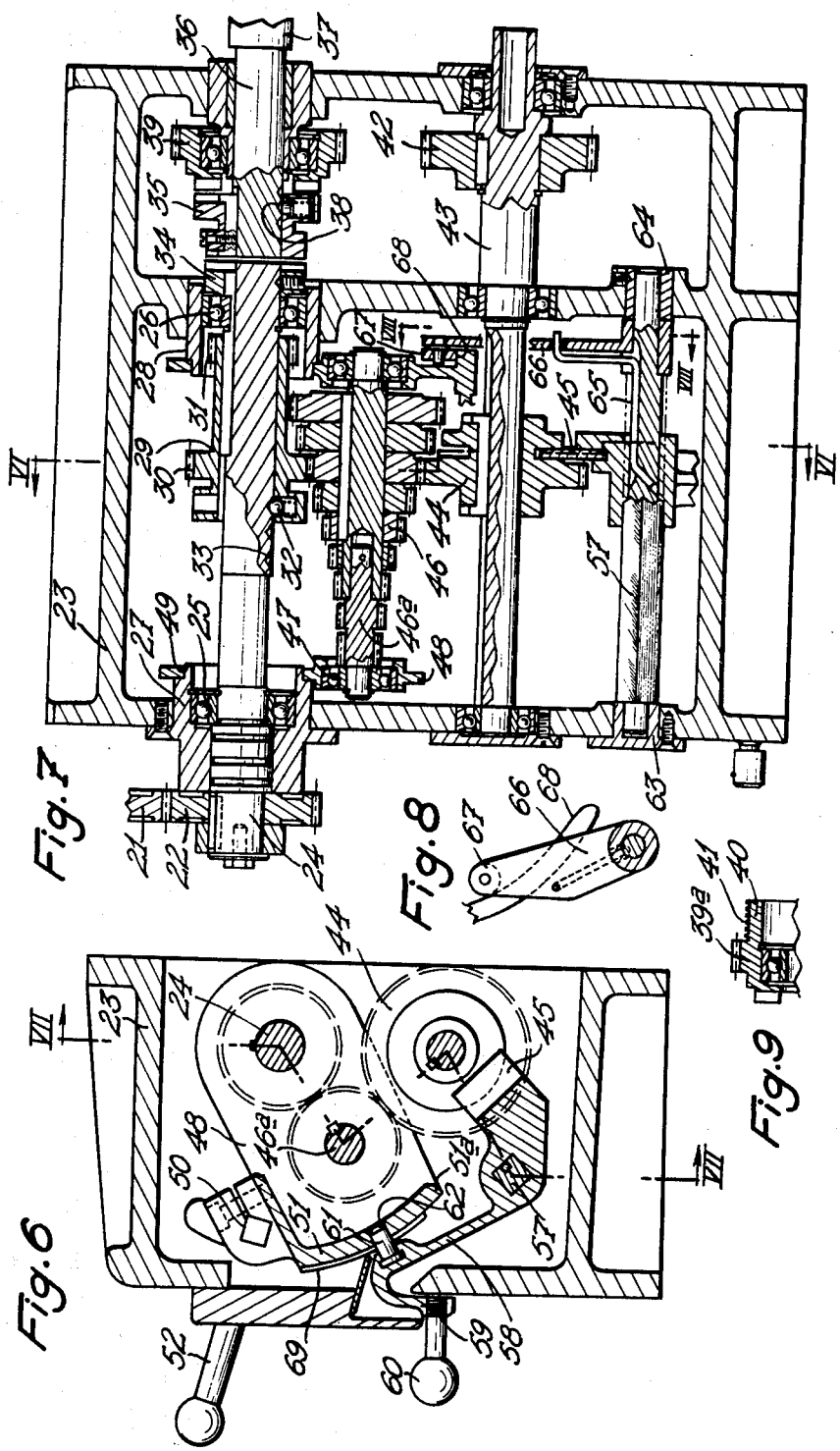

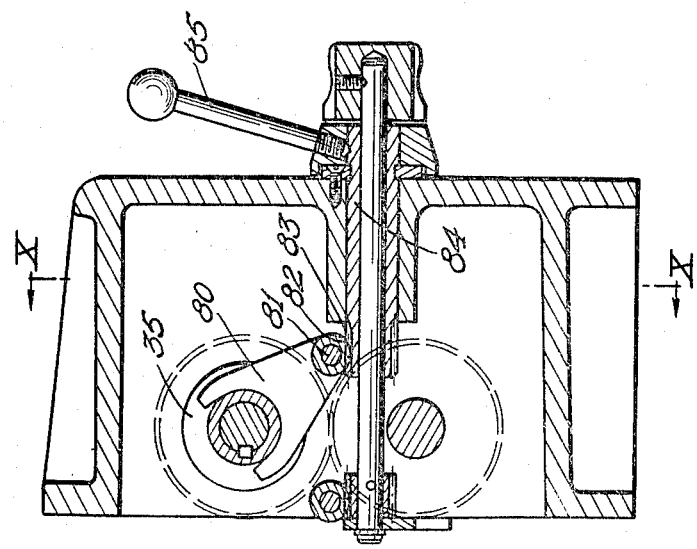
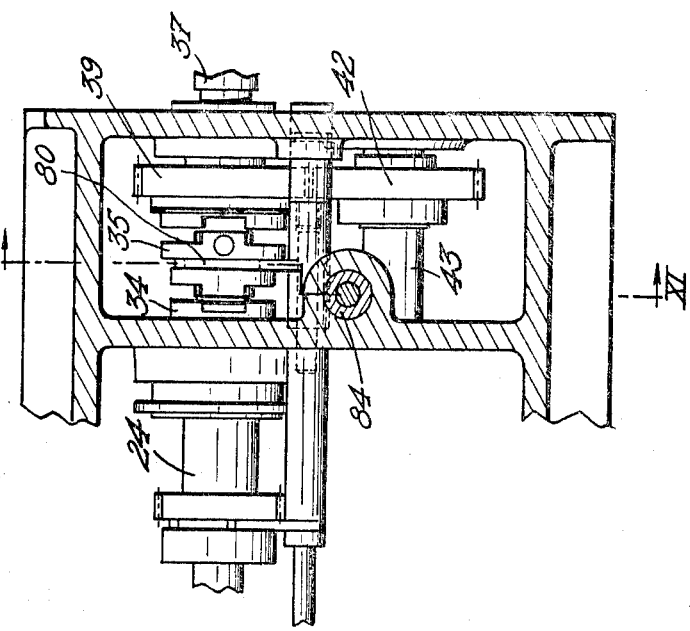

3,204,488
DEVICE FOR CONTROLLING FEED MOTIONS AND THE EXECUTION OF OPERATIONS SUCH AS SCREW-CUTTING ON A MACHINE TOOL
Pierre Francois de Valliere, 14 Avenue de Bretteville, Neuilly-sur-Seine, France
Filed Mar. 1, 1962, Ser. No. 176,619
Claims priority, application France, Mar. 7, 1961, 854,814, Patent 1,290,936
19 Claims. (Cl. 74—745)

This invention relates to a device for controlling feed motions and the execution of operations such as screw-cutting on machine tools, said device forming a kinematic system wherein the power is taken off the spindle shaft, for example, and the output applied to a lead-screw or traversing bar which may be independent or combined, or to any other rotating member.

An object of this invention is to simplify the construction of kinematic systems of this type while at the same time ensuring great control reliability. Furthermore, by recourse to simple means, such an assembly will set the machine in neutral in cases where abnormal resistances develop, thereby making it possible to operate machines equipped thus automatically, without supervision, by affording them protection against component failures.

In accordance with this invention, a device for controlling feed motions and the execution of operations such as screw-cutting comprises engaging and reversing means between the spindle shaft and the pick-up side of a conventional gear change assembly, and on the output side of said gear change assembly, a gearbox the driving shaft of which is provided with a sliding gear which meshes with at least one of the pinions in a cluster of intermediate pinions, said cluster being pivotally mounted about said driving shaft, while the mainshaft of the gearbox is likewise provided with a sliding gear which is displaceable opposite the pinions in the cluster, the pivotal motion of said cluster causing the same to mesh with said sliding gear. The mainshaft is provided with a power take-off pinion in constant mesh with a pinion slidably mounted on the lead-screw shaft, a double-ended dog enabling said lead-screw to be connected either with the driving shaft or with the said slidably mounted gear.

Through the instrumentality of yieldable locking means, the pivotal mounting of the gear cluster allows a disengagement to be obtained should the torque to be transmitted exceed predetermined values.

In like manner, the pivotal mounting enables advantageous constructional simplifications to be obtained by combining the mainshaft sliding pinion displacement controls with the pivotal motion locking means.

The description which follows with reference to the accompanying drawings, filed by way of example only and not of limitation, will give a clear understanding of how the invention may be carried into practice.

Referring to the drawings filed herewith:

FIG. 1 is a sectional view in side elevation of the engagement and reversal means according to the invention;

FIG. 2 is a front elevation view corresponding to FIG. 1;

FIG. 3 is a detail sectional view of the retention pegs for the reversing lever;

FIG. 4 is a fragmentary front elevation view of the gearbox;

FIG. 5 is a side elevation corresponding to FIG. 4;

FIG. 6 is a sectional side elevation view of the said gearbox, the section being taken through the broken line VI—VI in FIG. 7;

FIG. 7 is a section of the gearbox taken through the broken line VII—VII in FIG. 6, the section being developed and rotated into a plane;

FIG. 8 is a detail view, along the line VIII—VIII of FIG. 7, of the manner in which the lever for maintaining a gear ratio in engagement co-operates with the ramp providing yieldable pressure contact for the same;

FIG. 9 shows an alternative embodiment of the takeoff for a thread counter, as opposed to the form of construction in FIG. 7;

FIG. 10 is a sectional view of the double ended dog-clutch mechanism, taken through the line X—X of FIG. 11;

FIG. 11 is a sectional view of the same mechanism, taken through the line XI—XI of FIG. 10;

Figure 12:
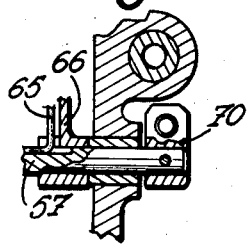
FIGS. 12 and 13 are sectional views, in front and side elevation respectively, of an alternative method of construction embodying a supplementary adjustment of the pressure contact of the lever for retaining a gear ratio in engagement.

In the layout illustrated by way of example but not of limitation, the kinematic assembly provides means for controlling, off a rotating machine tool spindle, the rotation of a lead-screw and a traversing bar, which may be independent or combined, as well as the rotation of any other rotary component on a machine tool other than a lathe.

Reference is now had to FIGS. 1 and 2, in which it may be seen that the machine tool spindle 1 is provided with a pinion 2 with which may come into meshing engagement two unequal gearwheels 3 and 4, both of which mesh with a conventional rocker which pivots about a shaft 5 which carries, on one end, a pinion 6 which is in constant mesh only with the gearwheel 4 and, on the other end, a pinion 7 mounted externally.

The gearwheels 3 and 4 and pinion 6 are contained in a rocker cage 8, which cage is angularly rigid with a pivoting bush 9 united, by tight keying means on the same side as the pinion 7, with a flat lever 10. The material from which this flat lever is made is such that the lever is rigid in the direction of its plane, in order to allow operation of the rocker and suitable pressure contact through reaction to the radial meshing force, and so that it is flexible in the direction transverse to its plane, in order to allow it to disengage from the retention stops whose purpose is to ensure fixedness of said lever in the neutral position and in the two meshing positions.

The said stops consist of pegs 11 and 12 FIG. 3 the operative surfaces of which are frusto-conical. It will be of advantage to provide an assembly part 13 which is fixedly screwed to the structure 14 and which is drilled to provide two lodgings 15 and 16 for the cylindrical stems of the pegs 11 and 12. These pegs are so spaced from each other as to enable them to receive a reduced portion 17 of lever 10, which exactly fits between said pegs in the neutral position, namely in the position wherein neither of gearwheels 3 or 4 meshes with pinion 2. For the other two meshing positions, said reduced portion 17 of lever 10 is provided with a hole 18 adapted to fit over either frusto-conical tip 11 or 12.

The end of the reduced portion 17 is curved slightly for co-operation with an operating lever 19 terminating in a ball 20. To obtain a change in motion—i.e. an engagement, a reversal or a setting in neutral—it will suffice to exert a normal thrust on said ball to cause the lever 10 to flex out of its plane and disengage from the pegs 11 and 12, following which, after it has been moved to the selected position, it may be released and will remain immovable in that position.

The pinion 7 provides the link between the spindle and a conventional gear change assembly (not shown), the take-off gearwheel 21 of which meshes with the pick-up pinion 22 of a gearbox having a casing 23 (see FIGS. 4 and 7), said pinion 22 being keyed to the gearbox driving shaft 24.

As is more clearly illustrated in FIG. 7, the driving shaft 24 rotates in ball bearings 25 and 26 which are mounted respectively in housings 27 and 28 fixed to the corresponding flanges of the casing 23, and said driving shaft carries a compound sliding gear 29 having two spaced pinions 30 and 31 of different diameters, said sliding gear being keyed to the shaft 24 and provided with yieldable or spring biased detent lock 32 adapted to co-operate with three notches 33 provided longitudinally on said shaft 24.

That end of shaft 24 which is remote from the end carrying the pinion 22 is provided with a clutch block 34, which is keyed to the shaft 24 and opposite which is disposed a double-ended dog 35 each face of which is provided with a single claw, and each claw has a skew-symmetric profile in order to prevent more than one engagement per turn. The dog 35 is slidably keyed onto the end portion 36 of a lead-screw 37, which end portion extends through one of the walls of the casing 23. The dog 35 is also provided with a ball 38 which is spring-loaded and which is adapted to co-operate with one of a set of three notches provided in the shaft 36.

The second face of the dog 35 is adapted to co-operate with a thread counter input pinion 39, said thread counter having a conventional meshing mechanism in accordance with the embodiment illustrated in FIG. 7, or having a reduced demultiplication as shown in FIG. 9. Accordingly, the pinion 39a is integral with a bushing 40 along the periphery of which is cut a screw thread 41 identical with those of the lead-screw 37. The pinion 39 meshes with a pinion 42 provided on the end of the gearbox mainshaft 43, said mainshaft end being connected externally to a traversing bar, for example.

Internal thereto, the gearbox comprises, on its mainshaft, an angularly keyed slidable pinion 44 which is displaceable by means of a fork 45. Between the pinion 44 and the driving shaft or more particularly either of the pinions 30 or 31, is disposed a pinion cluster 46 of the Norton type, carried on a shaft 46a. Shaft 46a is supported at its extremities by ball bearings 47 which are mounted in the flanges of a rocker 48. Each of these flanges is provided with a cylindrical bearing surface 49 which is adapted to rotate about aligned bearings provided on the end of the ball bearing bushing-type housings 27 and 28. The front face of the rocker 48 is formed by a spacer 51 in the shape of a bracket of which one flange is provided with a clampable square-headed stub, and the other flange, which is of cylindro-arcuate shape, constitutes one of the elements providing angular locking of the aforementioned Norton cluster.

The square stub 50 receives thereon a hand lever 52 for lowering the rocker. Lever 52 is supported by a spring 53 attached to an anchoring point 54 rigidly united with the machine structure. The lever 52 is cranked and extends through the casing 23 via a slot 55 FIG. 5, in the upper part of which is provided an adjustable stop 56.

The fork 45, providing transverse movement of the pinion 44, is mounted on a square shaft 57 (see FIG. 6) and is rigid with a cranked lever 58 having an actuately bent extremity 59, which extremity carries an actuating ball 60. In the region of its bend, the lever 58 carries a catch member 61 consisting, as clearly shown on FIG. 6, of a cylindrical peg which is adapted to successively co-operate with each of the locking holes 62 provided in the cylindro-arcuate portion of the spacer 51. The fork 45 comprises a blade which penetrates into a deep recess in the pinion 44, and the square shaft 57 has its extremities formed into journals co-operating with eccentric and adjustable bearings 63 and 64. The shaft 57 is fixed to a torsion bar 65 bearing against one arm of the lever 66 which terminates in a follower 67 adapted to co-operate with a ramp 68 provided on the branch of the rocker 48. The lever 66 is pivotally mounted on one of the suitably extended end journals of the square shaft 57.

The outer face of the cylindro-arcuate portion 51 of the rocker 48 is provided with parallel circle-arcuate ribs 69 which serve to separate different zones, each of which contains a single hole 62. The lower portions of these areas, in the region of the lower lip 51a of the cylindro-arcuate spacer 51, meet along indents of small depth aligned with said areas. The purpose of this arrangement is to sensitize the various axial positions which the peg 61 can occupy with reference to the guideway formed by the square shaft 57, thereby preventing any axial displacement of peg 61 when the rocker 48 is not fully raised.

The mechanism hereinbefore described functions as follows:

The sliding gear 29 is placed in a position other than its neutral point, whereupon its pinion 30 meshes with an intermediate gear of the cluster 46 or its pinion 31 with one of the end pinions of the said cluster. Such meshing will in fact take place irrespective of the angular position of the rocker 48, the pivotal axis of which is coaxial with that of the sliding gear 29.

Through the agency of the ball 60, the peg 61 is moved into some known transverse position which results in the pinion 44 (displaced along its shaft 43 by the blade 45) and one of the pinions in the cluster 46 being brought face to face. In this position, by means of the lever 52 and by extending the spring 53, the cluster 46 is swung over to provide meshing with the pinion 44. When the meshing position is reached, the peg 61 drops into the corresponding hole 62, thus locking the rocker 48. Such locking is yieldably maintained by the effect of the torsion bar 65, which operates on the square shaft 57, said torsion bar acquiring its purchase from the lever 66 which is itself maintained through contact of its follower 67 on the rocker ramp 68. The holes 62 correspond axially with the different positions of the pinion 44 and angularly with the different angular positions of the rocker 48.

To obtain a different gear ratio, it will suffice to act downwardly on the ball 60 extending through to the casing, thus causing extraction of the peg 61 from its hole 62. The rocker 48 is then pulled into its upward position by the spring 53, in which position no further meshing with the pinion 44 occurs. When the ball 60 is released, the torsion bar 65 raises it by reason of the thrust exerted by the follower 67 against the ramp 68, and said ball will then occupy an angular position indicating that no speed is engaged, since the extremity of the peg 61 will be resting upon the lower lip of the cylindro-arcuate spacer 51. The ball 60 can then be acted upon in a transverse direction in order to move the pinion 44 opposite a different pinion in the cluster 46, after which the lever 52 may be lowered to obtain the desired gear engagement which will be locked as soon as the peg 61 drops into the corresponding hole 62.

As long as the rocker 48 has not been fully raised, the ribs 69 will prevent any transverse displacement of the ball 60.

The end of the ramp 68 is suitably rounded to permit relaxation of the torsion bar 65 at the end of the upward travel of the rocker 48 (see FIG. 8), thereby greatly facilitating the sliding motion of the fork 45 and its lever 58 along the square shaft 57.

Since the square shaft 57 is mounted by its journaled ends in eccentric adjustment bearings 63 and 64, any rotation of the bearings will produce a displacement of the peg 61, to which displacement will correspond a homologous displacement of the rocker 48 in the locked position. Thus, the pinion 44 can be adjusted to ensure correct meshing with the smallest or the largest pinion in the pinion cluster 46.

Figure 16:
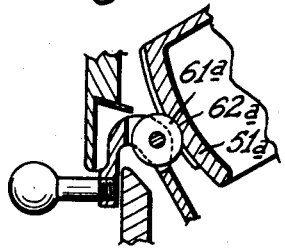
FIGS. 16 through 18 illustrate three possible embodiments of the disengageable-type gear ratio locking device.
Figure 17:
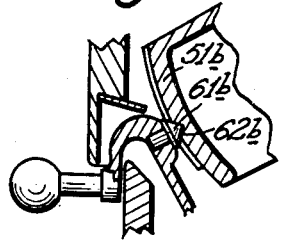
Figure 18:
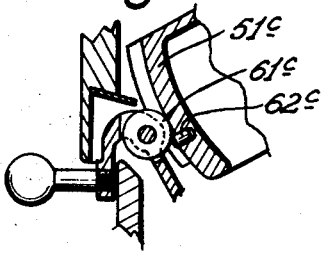

In the arrangement described hereinabove, disengagement of the transmission can be effected instantly, either manually or by means of an auxiliary control, by operating on the lever carrying the ball 60 which results in the withdrawal of the peg 61 from its hole 62. In lieu of a positive locking device as illustrated in FIG. 6, recourse could be made to a yieldable locking means such as illustrated in FIGS. 16 to 18. In accordance with the first embodiment of construction shown in FIG. 16, the peg 61 is replaced by a roller 61a, and the arcuate spacer 51a is provided with matching arcuate recesses 62a of suitable depth. In the embodiment shown in FIG. 17, the peg 59 is replaced by a conical point 61b adapted to co-operate with mating conical notches 62b. In the embodiment of FIG. 18 a roller 61c is adapted to co-operate with the studs 62c inserted into corresponding holes in the spacer 51c. The depth of engagement or the height of the studs can be used to choose the magnitude of the force required to disengage each pair of meshing pinions (pinion 44 and cluster 46) and thereby ensure a break in the drive at torques exceeding pre-established values.

Such disengagement torques can also be determined by recourse to an appropriate profile for the ramp 68 co-operating with the follower 67 wherein the ramp controls the pressure which the lever 58 exerts in the direction of the spacer 51, through the medium of the torsion bar 65.

It will in fact be of advantage to provide an auxiliary adjustment means for this pressure, by reason of the diversity of torques to be transmitted as a result of the variety of types of work that can be executed on a machine tool provided with a gear box as hereinbefore described.

Figure 13:
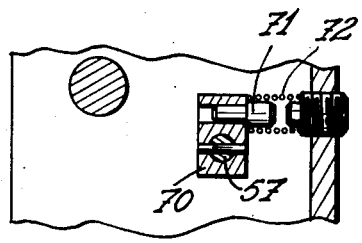

As clearly shown in FIGS. 12 and 13, it is possible to supplement the lever 66 and the torsion bar 67 operating on the square shaft 57 with a short lever 70 cottered to the protruding extremity of said square shaft, which short lever carries a locating dowel 71 for an auxiliary spring 72 which thrusts against the face of an adjustment screw 73. Thus the supplementary effect provided by the spring 72 is adjustable by means of the screw 73.

Figure 14:
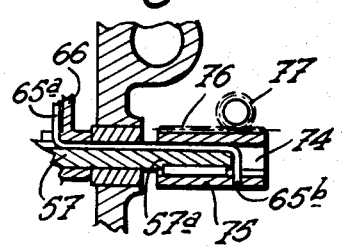
FIGS. 14 and 15 are views, analogous to FIGS. 12 and 13, of a further embodiment.
Figure 15:
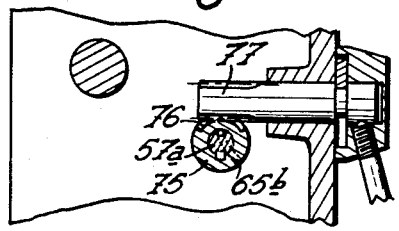

As shown in FIGS. 14 and 15, it is alternatively possible to operate on the thrust point of a torsion bar 65a, the said thrust point being opposite the anchorage point of the torsion bar on the lever 66.

The torsion bar 65a accordingly extends through a recessed portion 74 provided in the end of an extension 57a of the square shaft 57, and which receives a bushing 75 which is provided with a suitably contoured slot into which engages the extremity 65b of the torsion bar. The bushing 75 is slidably keyed to the extension 57a and supports a rack 76 drivingly engaged by a pinion 77. The axial position of the bushing 75 determines the angular position of the anchorage point 65b of torsion bar 65a on the square shaft 57.

The lead-screw 37 is adapted to be driven by the double-ended dog 35, either directly off the shaft 24—in which case transmission is direct and the gearbox is bypassed—or through the medium of the pinion 39 driven by the pinion 42 which is in turn driven by the shaft 43—in which case transmission takes place through the gearbox.

The dog 35 is controlled by a fork 80 which is supported on a rod 81 slidably mounted parallel to the shafts 24 and 43. The fork 80 is rigidly connected to a rack 82 which can be drivingly engaged by a terminal pinion 83 on a hollow shaft 84 to which is fixed an operating lever 85.

The rod 81 is itself rigid, inside the lathe bed which it follows longitudinally, with adjustable stops which may be contacted by corresponding arresting catches carried by the lathe saddle or apron.

Thus, by suitably operating on the lever 85, the dog 35 can be placed in the neutral position, or in engagement with the block 34 or the pinion 39. On this action will be superimposed the end-of-travel monitoring, through direct control of the rod 81.

This device therefore provides automatic end-of-travel disengagement of the saddle or the apron in the direction of travel towards the gearbox, when the lead-screw is driven through the medium of said gearbox.

Automatic end-of-travel disengagement is also obtained in the direction of travel away from the gearbox, when the lead-screw is driven directly by the shaft 24. Since, by virtue of the design, the shaft 24 and the pinion 39 rotate in opposite directions when the power is transmitted through the gearbox, and since the dog 35 is provided with a single claw with non-parallel sides which prevent it from engaging its clutch blocks more than once per turn. The direct and combined actions of the saddle or the apron on the lever 85 and the rod 81 make it possible, on a lathe provided with such a mechanism, to cut screw threads from stop to stop without reversing the rotation of the spindle and without opening the lead-screw nut, either directly (for sub-multiples of the lead-screw pitch), or by utilizing a conventional type thread counter that can be driven off either the pinion 39 or a pinion 39a as hereinbefore described. The counter remains in phase with the spindle at all times.

In addition, it should be noted that, in cases where the screw cutting involves operation of the gearbox, the return travel—obtained by placing the shaft 24 in direct mesh with the gear change assembly—will take place at higher speed, except for the maximum pitch, in which the ratio of the forward speed to the return speed is equal to unity.

It will of course be understood that many modifications may be made to the specific embodiments hereinbefore described, without departing from the scope of the invention.

What I claim is:

1. In apparatus for controlling feed motions of a machine having a spindle shaft connected to a transmission which drives a lead screw and wherein said transmission includes a gear change assembly including an input and an output, the combination comprising: engaging and reversing means coupled to the input of said change assembly; a primary shaft coupled to the output of said gear change assembly and a direct and separable connecting means for coupling said primary shaft to said lead screw comprising: a first sliding gear means including a plurality of pinions slidably keyed to said primary shaft; and intermediate pinion cluster including a plurality of pinions wherein one of the pinions of said intermediate pinion cluster engages one of the pinions of said primary shaft, a shaft for supporting said pinions of said pinion cluster; supporting means for supporting the shaft of said pinion cluster, said supporting means including bearing means for rockably carrying said supporting means wherein said bearing means is coaxially disposed with respect to said primary shaft; a secondary shaft including a secondary slidable pinion slidably keyed to said secondary shaft and displaceable past the pinions of said intermediate pinion cluster when said intermediate pinion cluster is rocked into meshing position, an output pinion on said secondary shaft; a gear wheel supported fully rotatable on said lead screw and constantly engaging the output pinion of said secondary shaft; and clutching means operatively disposed between said gear wheel and said lead screw.

2. The apparatus according to claim 1 wherein said engaging and reversing means comprises a rocker, a control lever for said rocker, said control lever having a relatively flat form and being yieldingly displaceable transversally but rigid in its plane, and spaced retention stops for said lever.

3. The apparatus according to claim 2 wherein said control lever includes a region of reduced width in its zone of cooperation with said stops, said region including a recess having a dimension corresponding to a distance of separation of two of said stops, and said recess having dimensions corresponding to the dimensions on each of said stops.

4. Apparatus according to claim 1, wherein said first sliding gear means includes at least two spaced pinions and including locking means for axially locking said first sliding gear means on said primary shaft, said locking means having three rest positions, whereby said two spaced pinions alternatively cooperates, on either side of a neutral position, with a corresponding pinion of said pinion cluster.

5. Apparatus according to claim 1, including tubular housing for bearings of said primary shaft having external surfaces which constitute bearing surfaces for said supporting means.

6. Apparatus according to claim 5, wherein the supporting means for the shaft of said intermediate pinion cluster includes two spaced flanges each of which is oscillatably supported on corresponding external surface of said tubular housing for corresponding bearings of said primary shaft, a front spacer joining said flanges, said spacer having a sector-cylindrical shape the axis of which is the axis of said primary shaft, a staggered locking means on an external surface of said spacer, the positions of which locking means corresponding respectively to various angular positions of said spacer, resilient return means for said supporting means in a position of disengagement of said pinion cluster and of said secondary sliding pinion, and catching means operatively cooperating with said locking means.

7. Apparatus according to claim 6 wherein said locking means and said catching means, operatively cooperate in a positive manner.

8. Apparatus according to claim 6 wherein said locking means includes oblique walls and said catching means includes conjugated forms, whereby the locking actions are yieldably disengaged under the action of forces acting on said supporting means and having values exceeding predetermined magnitudes.

9. Apparatus according to claim 6 wherein said locking means is formed by studs protruding to a given extent over said spacer and said catching means includes a roller matching said studs, whereby the locking actions are yieldably disengaged under the action of forces acting on said supporting means and having values exceeding predetermined magnitudes.

10. Apparatus according to claim 6 including partitions between each of said locking means transversally impassable by said catching means, and a terminal area on said spacer in which said partitions are reduced to traces upon which said catching means are only yieldably sensitized, said terminal area being situated on said spacer in a position corresponding to disengagement of said pinion cluster and of said secondary sliding pinion.

11. Apparatus according to claim 6, including displacing means for said secondary sliding pinion and a catch on a yieldably displaceable part on said displacing means.

12. Apparatus according to claim 11 wherein said displacing means comprises a lever having at one end a blade slidably inserted into a groove in said secondary sliding pinion, the other end of said lever supporting said catching means, said lever being oscillatably and slidingly mounted and provided with yieldable means for biasing it in the direction of engagement of said catching means with said locking means.

13. Apparatus according to claim 12 wherein said yieldable means acting on said lever comprises pressure contact means against a ramp carried by said supporting means.

14. Apparatus according to claim 12 wherein said yieldable means acting on said lever comprises a torsion bar attached at one end to a prismatic shaft on which is slidably mounted said lever, and at the other end, to an arm, pivotally mounted on a cylindrical extension of said prismatic shaft, said arm having at its free end a reaction follower in pressure contact with a ramp carried by said supporting means.

15. Apparatus as claimed in claim 14, including transversally adjustable bearings for supporting said prismatic shaft.

16. Apparatus as claimed in claim 14, including complementary adjustable elastic means for supplementing the action of said torsion bar.

17. Apparatus as claimed in claim 16 wherein said complementary adjustable elastic means comprises an adjustable anchoring device at one end of said torsion bar.

18. Apparatus as claimed in claim 16 wherein said complementary elastic means comprises a spring, an adjustable stop for said spring and a crank against which is urged said spring, said crank being fixed to said prismatic shaft.

19. Apparatus as claimed in claim 1, joining means comprising, between an extremity of said primary shaft and an extremity of said lead-screw supporting said freely rotatable output gear-wheel, a double-ended dog including faces each of which includes a single claw with a skew-symmetric profile engageable alternatively with corresponding clutch blocks situated respectively on said end of said primary shaft and on a corresponding flange of said gear wheel, said dog being slidingly keyed on said lead screw, and a three position yieldable locking means between said lead-screw and said dog.

References Cited by the Examiner

UNITED STATES PATENTS

| | | | |
|---|---|---|---|
| 2,548,337 | 4/51 | Barraco | 74—352 |
| 2,673,472 | 3/54 | Dickas et al. | 74—348 |

DON A. WAITE, *Primary Examiner.*